US011134618B2

(12) United States Patent
Dubuc et al.

(10) Patent No.: US 11,134,618 B2
(45) Date of Patent: Oct. 5, 2021

(54) LUMINAIRE INCLUDING A HEAT DISSIPATION STRUCTURE

(71) Applicant: Current Lighting Solutions, LLC, East Cleveland, OH (US)

(72) Inventors: Eden Dubuc, Lachine (CA); Robert David Spivock, Lachine (CA)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/494,573

(22) Filed: Apr. 24, 2017

(65) Prior Publication Data

US 2018/0054978 A1    Mar. 1, 2018

Related U.S. Application Data

(60) Provisional application No. 62/381,409, filed on Aug. 30, 2016.

(51) Int. Cl.
*F21V 29/507* (2015.01)
*F21V 29/00* (2015.01)
(Continued)

(52) U.S. Cl.
CPC ............... *A01G 9/20* (2013.01); *A01G 7/045* (2013.01); *F21V 29/00* (2013.01); *F21V 29/507* (2015.01);
(Continued)

(58) Field of Classification Search
CPC ...... F21S 48/32; F21S 4/20; F21S 4/22; F21S 8/066; F21V 15/01; F21V 15/013; F21V 23/004; F21V 23/005; F21V 23/007; F21V 23/008; F21V 29/006; F21V 29/763; F21V 29/2212; F21V 29/40; F21V 29/70; F21V 29/74; F21V 3/0418; F21V 29/83;
(Continued)

(56) References Cited

U.S. PATENT DOCUMENTS 4,694,881 A * 9/1987 Busk .................. C22C 1/005
164/113
6,093,961 A * 7/2000 McCullough ....... H01L 23/3737
174/16.3
(Continued)

FOREIGN PATENT DOCUMENTS

CN    204026375 U    12/2014
CN    204328966 U    5/2015
(Continued)

OTHER PUBLICATIONS

Qin, Solid-State Light Source Heat-Radiating Metal Shell and Light Source Engine, and Method and Mould for Manufacturing Same, Sep. 12, 2014, WO2014134977A1, English (Year: 2014).*
(Continued)

*Primary Examiner* — Jong-Suk (James) Lee
*Assistant Examiner* — James M Endo
(74) *Attorney, Agent, or Firm* — Buckley, Maschoff & Talwalkar LLC (57) ABSTRACT

There are provided luminaire assemblies and methods of assemblies thereof. For example, there is provided a luminaire assembly including a hollow core and an overmolded thermal dissipation structure molded over the hollow core.

13 Claims, 6 Drawing Sheets

US 11,134,618 B2
Page 2

(51) Int. Cl.
| | |
|---|---|
| *F21V 29/83* | (2015.01) |
| *F21V 29/76* | (2015.01) |
| *F21V 29/89* | (2015.01) |
| *F21V 29/74* | (2015.01) |
| *F21Y 115/10* | (2016.01) |
| *F21S 4/20* | (2016.01) |
| *A01G 9/20* | (2006.01) |
| *A01G 7/04* | (2006.01) |

(52) U.S. Cl.
CPC ............ *F21V 29/763* (2015.01); *F21V 29/83* (2015.01); *F21V 29/89* (2015.01); *F21S 4/20* (2016.01); *F21V 29/74* (2015.01); *F21V 29/767* (2015.01); *F21Y 2115/10* (2016.08)

(58) Field of Classification Search
CPC ........ F21V 29/507; F21V 29/89; F21V 29/00; F21V 29/50; F21V 29/502; F21V 29/503; F21V 29/71; F21V 29/713; F21V 29/767; F21V 29/777; F21V 21/005; F21V 21/34; F21V 19/008; F21V 19/0035; F21V 19/0045; F21V 19/003; F21V 17/06; F21K 9/20; F21K 9/275; F21K 9/27; F21Y 2105/10; A01G 9/20; A01G 7/045; F28F 1/105; F28F 1/12; F28F 1/16; F28F 2255/146; F28F 2255/16; B23P 15/26; H01L 21/4878; H01L 21/4882
See application file for complete search history.

(56) References Cited

U.S. PATENT DOCUMENTS

| | | | | | |
|---|---|---|---|---|---|
| 7,269,013 | B2* | 9/2007 | Chen | ................... | H01L 23/4006 165/104.19 |
| 7,543,960 | B2* | 6/2009 | Chang | ................... | B82Y 10/00 362/294 |
| 7,753,568 | B2* | 7/2010 | Hu | ................... | F21K 9/00 362/373 |
| 7,878,691 | B2 | 2/2011 | Liang | | |
| 7,923,748 | B2* | 4/2011 | Ruffin | ................... | F21V 17/10 257/720 |
| 8,801,222 | B2* | 8/2014 | Wung | ................... | F21V 29/2206 362/249.02 |
| 2002/0141197 | A1* | 10/2002 | Petroski | ................... | F21V 29/70 362/373 |
| 2003/0116309 | A1* | 6/2003 | Dispenza | ................... | B21D 53/085 165/151 |
| 2006/0290891 | A1* | 12/2006 | Wang | ................... | G03B 21/16 353/52 |
| 2007/0079954 | A1* | 4/2007 | Wang | ................... | F28D 15/0233 165/104.26 |
| 2007/0097692 | A1* | 5/2007 | Suehiro | ................... | F21K 9/00 362/294 |
| 2007/0183156 | A1* | 8/2007 | Shan | ................... | F21V 29/70 362/277 |
| 2007/0236935 | A1* | 10/2007 | Wang | ................... | F21K 9/00 362/294 |
| 2007/0253202 | A1* | 11/2007 | Wu | ................... | F21V 29/006 362/294 |
| 2007/0279862 | A1* | 12/2007 | Li | ................... | F21V 29/004 361/692 |
| 2008/0074844 | A1* | 3/2008 | Liaw | ................... | F28D 15/02 361/702 |
| 2009/0071637 | A1* | 3/2009 | Liao | ................... | F28D 15/046 165/104.33 |
| 2009/0147520 | A1* | 6/2009 | Liu | ................... | F21K 9/00 362/294 |
| 2009/0154169 | A1* | 6/2009 | Liu | ................... | F21K 9/00 362/310 |
| 2009/0260790 | A1* | 10/2009 | Wang | ................... | B23P 15/26 165/177 |
| 2010/0046168 | A1* | 2/2010 | Liaw | ................... | F21V 29/006 361/704 |
| 2010/0084116 | A1* | 4/2010 | Chen | ................... | F28F 1/20 165/80.3 |
| 2010/0097794 | A1* | 4/2010 | Teng | ................... | F21V 7/09 362/231 |
| 2010/0195331 | A1* | 8/2010 | Kondo | ................... | F21K 9/00 362/249.02 |
| 2010/0271823 | A1* | 10/2010 | Huang | ................... | F21K 9/00 362/249.02 |
| 2011/0241058 | A1* | 10/2011 | Chien | ................... | H01L 33/642 257/99 |
| 2011/0254425 | A1* | 10/2011 | Huang | ................... | F21V 3/00 313/46 |
| 2011/0273871 | A1* | 11/2011 | Fukui | ................... | F21V 23/006 362/49.02 |
| 2011/0309403 | A1* | 12/2011 | Kawashima | ............ | F21V 31/04 257/99 |
| 2012/0043067 | A1* | 2/2012 | Huang | ................... | B23P 15/26 165/185 |
| 2012/0080177 | A1* | 4/2012 | Lee | ................... | F28D 15/0233 165/185 |
| 2012/0161630 | A1* | 6/2012 | Miki | ................... | F21V 3/00 315/51 |
| 2012/0314427 | A1* | 12/2012 | Lin | ................... | F21V 29/773 362/373 |
| 2013/0250575 | A1* | 9/2013 | Wilcox | ................... | F21S 8/02 362/241 |
| 2013/0294093 | A1* | 11/2013 | Ahn | ................... | F21K 9/135 362/373 |
| 2014/0240972 | A1* | 8/2014 | Ye | ................... | F21V 19/004 362/217.13 |
| 2014/0334149 | A1* | 11/2014 | Nolan | ................... | F21V 5/007 362/235 |
| 2014/0338878 | A1 | 11/2014 | Tessnow | | |
| 2015/0124440 | A1* | 5/2015 | Janjua | ................... | F21S 8/02 362/223 |
| 2015/0267899 | A1 | 9/2015 | Baright | | |
| 2016/0245498 | A1 | 8/2016 | Ghasabi | | |
| 2016/0273752 | A1* | 9/2016 | Boomgaarden | .... | H05B 37/0272 |

FOREIGN PATENT DOCUMENTS

| | | | |
|---|---|---|---|
| CN | 205101940 U | 3/2016 | |
| CN | 205402266 U | 7/2016 | |
| DE | 10 2011 086789 A1 | 5/2013 | |
| DE | 102011086789 A1 | 5/2013 | |
| EP | 0 457 645 A2 | 11/1991 | |
| EP | 0457645 A2 | 11/1991 | |
| EP | 2 789 893 A1 | 10/2014 | |
| EP | 2789893 A1 | 10/2014 | |
| WO | 2012/168845 A1 | 12/2012 | |
| WO | 2013/075880 A1 | 5/2013 | |
| WO | W-2014134977 A1 * | 9/2014 | ............. F21V 29/78 |
| WO | 2016108138 A1 | 7/2016 | |

OTHER PUBLICATIONS

Extended European Search Report and Opinion issued in connection with corresponding EP Application No. 17188448.9 dated Nov. 22, 2017.
Office Action issued in connection with corresponding EP Application No. 17188448.9 dated Jan. 22, 2019.
Office Action Issued in connection with corresponding Chinese Application No. 201710763635.0 dated Mar. 2, 2020.

* cited by examiner

LUMINAIRE INCLUDING A HEAT DISSIPATION STRUCTURE

CROSS-REFERENCE

The present disclosure is a non-provisional application claiming priority to provisional application No. 62/381,409 filed on Aug. 30, 2016, incorporated by reference herein in its entirety.

I. TECHNICAL FIELD

The present disclosure relates to luminaires. More particularly, the present disclosure relates luminaires including heat dissipation structures.

I. BACKGROUND

In greenhouses, luminaires that are used to shine light on specimens must be compact in order to avoid shadowing the specimens during daytime. In other words, the luminaires must obstruct as little sunlight as possible, in order to maximize the specimens' exposure. Furthermore, greenhouse luminaires must be able provide ample illumination in the absence of sunlight. The latter constraint usually means that high intensity light sources (e.g. high power LEDs) must be used, which require large thermal management components to dissipate heat and keep the luminaires cool. These large thermal management components can render the luminaires bulky and cause excessive shadowing.

II. SUMMARY

The embodiments featured herein help solve or mitigate the above noted issues as well as other issues known in the art. Specifically, in luminaire design, there is a tradeoff between power requirements and luminaire form factor. The embodiments provide apparatuses and assembly methods for mitigating the power-to-form factor tradeoff.

Sated otherwise, there is a need to create the smallest, lightest, and most thermally efficient luminaire for greenhouse applications. Thermal hardware fabricated via extrusion are typically complex to use because their geometry has typically been in two dimensions. Furthermore, an assembly of multiple extrusions can generate multiple heat transfer interface which reduce the thermal efficacy. Moreover, casting designs can have less efficient thermal conduction, and they can be heavy.

Some of the embodiments featured herein provide overmolded fins on extruded metal cores, thus circumventing the aforementioned issues. Specifically, some of the embodiments provide large thermal management hardware without compromising form factor, which means that an exemplary luminaire according to the teachings set forth herein can deliver enough power for greenhouse applications, without shadowing specimens placed directly underneath the luminaire.

For example, one embodiment provides a luminaire assembly including a hollow core and an overmolded thermal dissipation structure disposed over the hollow core. Another exemplary embodiment provides a method for assembling a luminaire. The method includes providing an overmolded thermal dissipation structure on an extruded hollow core configured to support a platform having a light source disposed thereon.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

III. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

IV. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
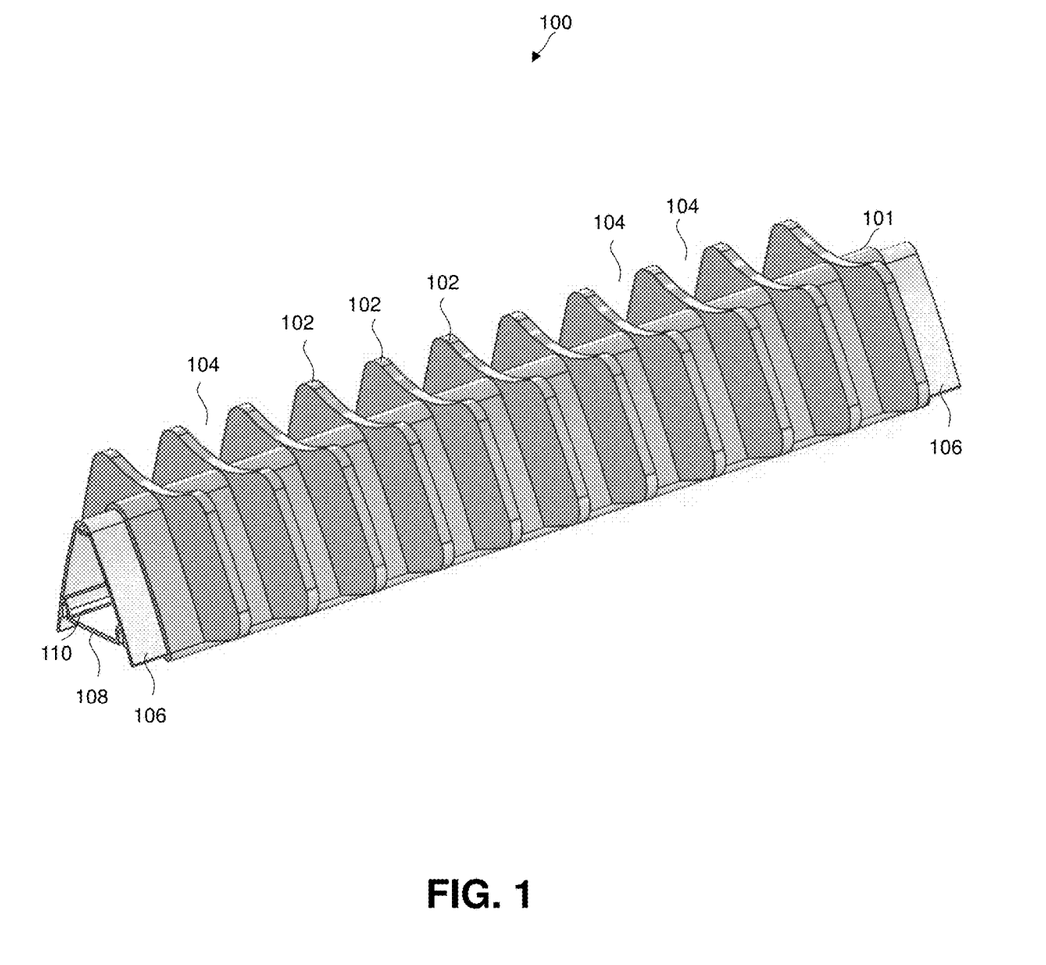
FIG. 1 illustrates an assembly of a luminaire in accordance with several aspects described herein.

FIG. 1 illustrates a luminaire assembly 100, according to an exemplary embodiment. The luminaire assembly 100 includes an overmolded thermal dissipation structure 101 that is molded directly on a hollow core 106. The overmolded thermal dissipation structure 101 can be made from a molding process, such as die cast molding or the like, directly on the hollow core 106, which itself can be made from a metal extrusion process.

The overmolded thermal dissipation structure 101 includes a plurality of fins 102; some or all of the fins can be equally spaced. In general, the spacing between the fins are dictated by the application at hand, i.e. by the thermal dissipation and air flow constraints that govern the application in which the luminaire assembly 100 is intended for. In other words, while the fins are shown in FIG. 1 to have a fixed spacing 104 between them, other distances between the fins can be used without departing from the scope of the present disclosure.

The overmolded heat dissipation structure 101 is configured to cool the electronics (not shown) supported by a platform 108 of the hollow core 106. This is achieved by dissipating heat originating from the electronics via sidewalls of the hollow core 106. The plurality of fins 102, as configured, provide an air flow pattern that promotes heat dissipation and the electronics' cooling. The hollow core 106 further includes a cavity 110 through which electrical wiring (not shown) that interfaces with the electronics on the platform 108 can pass.

In some embodiments, the hollow core 106 and the overmolded thermal dissipation structure 101 can be made of the same material. For example, they can each be made from either aluminum or copper. In other embodiments, they can be made from materials that have substantially the same coefficient of thermal expansion (CTE).

Figure 2:
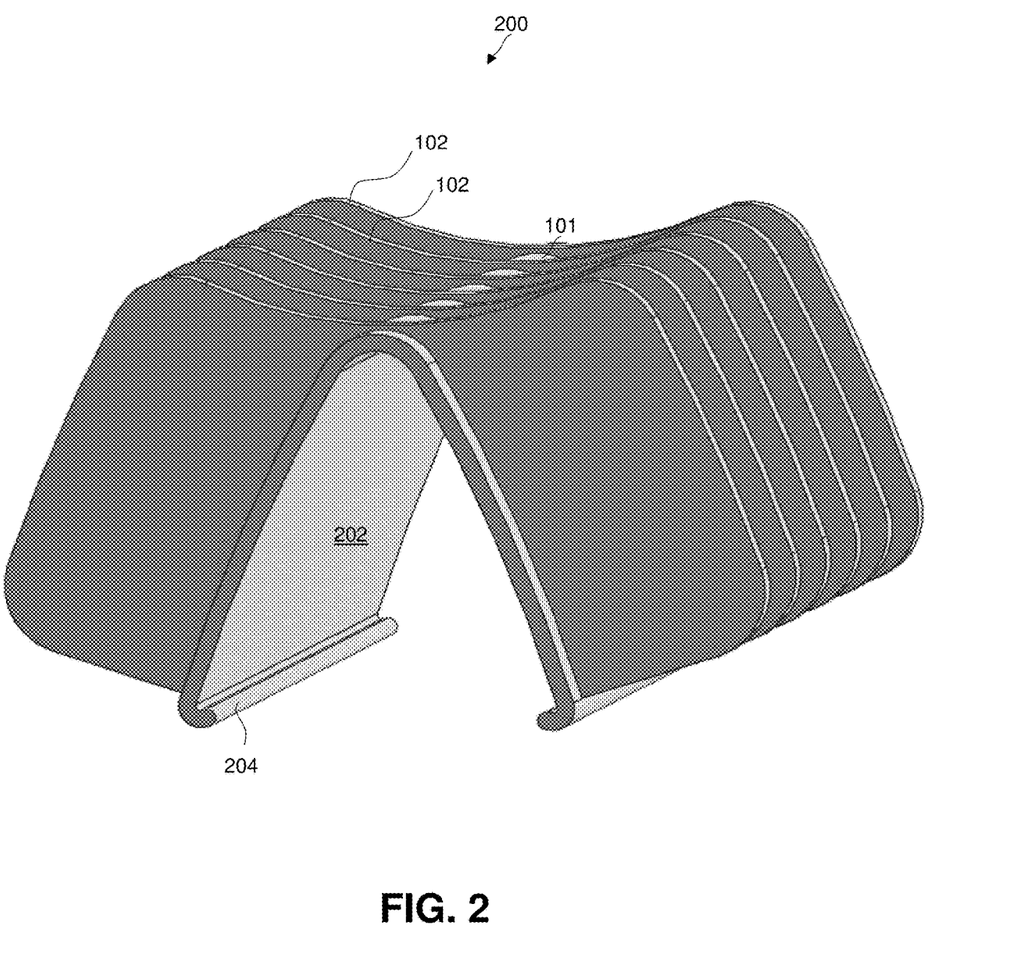
FIG. 2 illustrates a perspective view of an overmold in accordance with several aspects described herein.

FIG. 2 illustrates a perspective view 200 of the overmolded thermal dissipation structure 101. It is substantially V-shaped so that it can complementarily fit on the hollow core 106, which too, has a substantially V-shaped cross-section. However, while the hollow core 106 and the overmolded thermal dissipation structure 101 are each shown to be V-shaped, other shapes such as a square or a rectangular cross-sections can be used. One of ordinary skill in the art will readily understand that different shapes can yield different air flow and heat dissipation patterns but that other shapes fall within the scope of the present disclosure.

The overmolded heat dissipation structure 101 includes an inner surface 202 that contacts the outer surface of the hollow core 106 when the latter is molded onto the former, as shown in FIG. 1. The overmolded heat dissipation structure 101 further includes a lip 204 that is used as a passive support for the hollow core 106 once the overmolded heat dissipation structure 101 is molded thereon.

Figure 3:
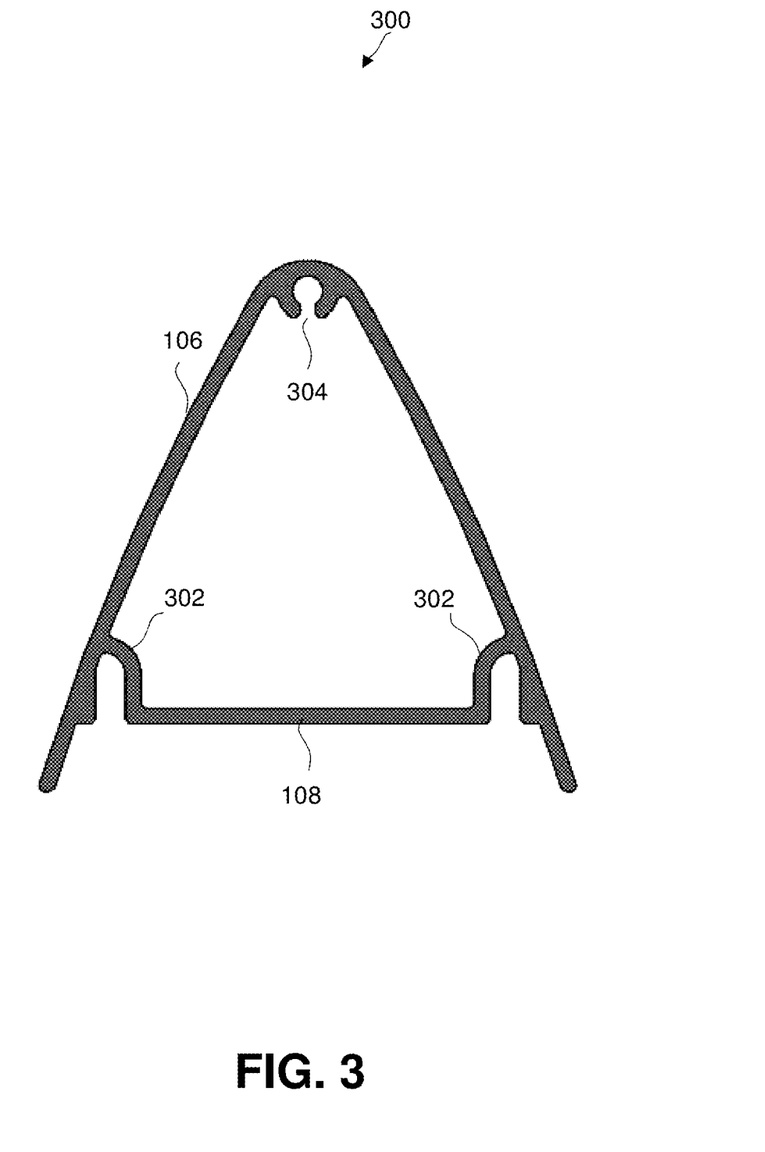
FIG. 3 illustrates a cross-sectional view of a core in accordance with several aspects described herein.

FIG. 3 illustrates a cross-sectional view 300 of the hollow core 106. As previously mentioned, in this non-limiting exemplary embodiment, the hollow core 106 has a substantially V-shaped cross-section (as shown upside down in FIG. 3). The hollow core 106 includes recesses 302 and 304 that can be used to mount an end cap on the hollow core 106 to close the cavity 110. Moreover, the platform 108 can be made when the hollow core 106 is extruded.

Figure 4:
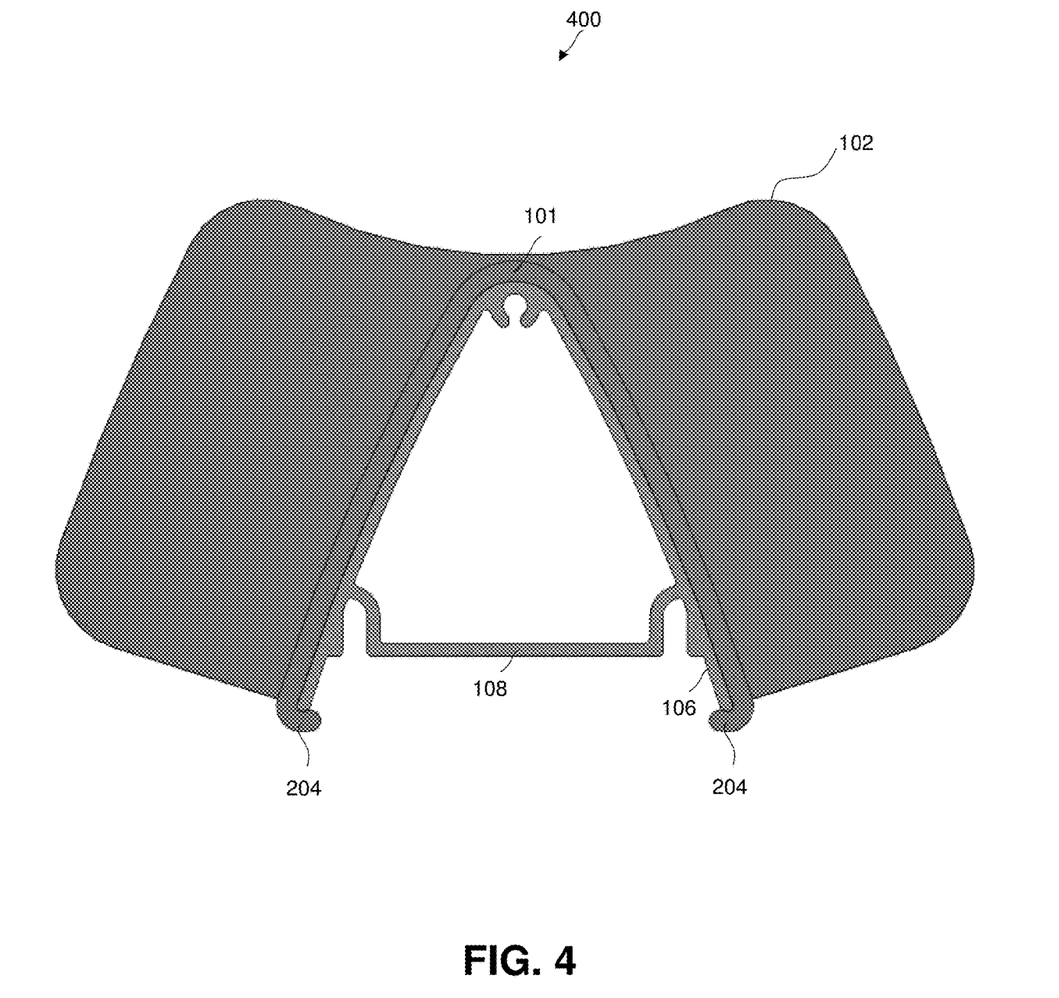
FIG. 4 illustrates a cross-sectional view of a luminaire in accordance with several aspects described herein.
Figure 5:
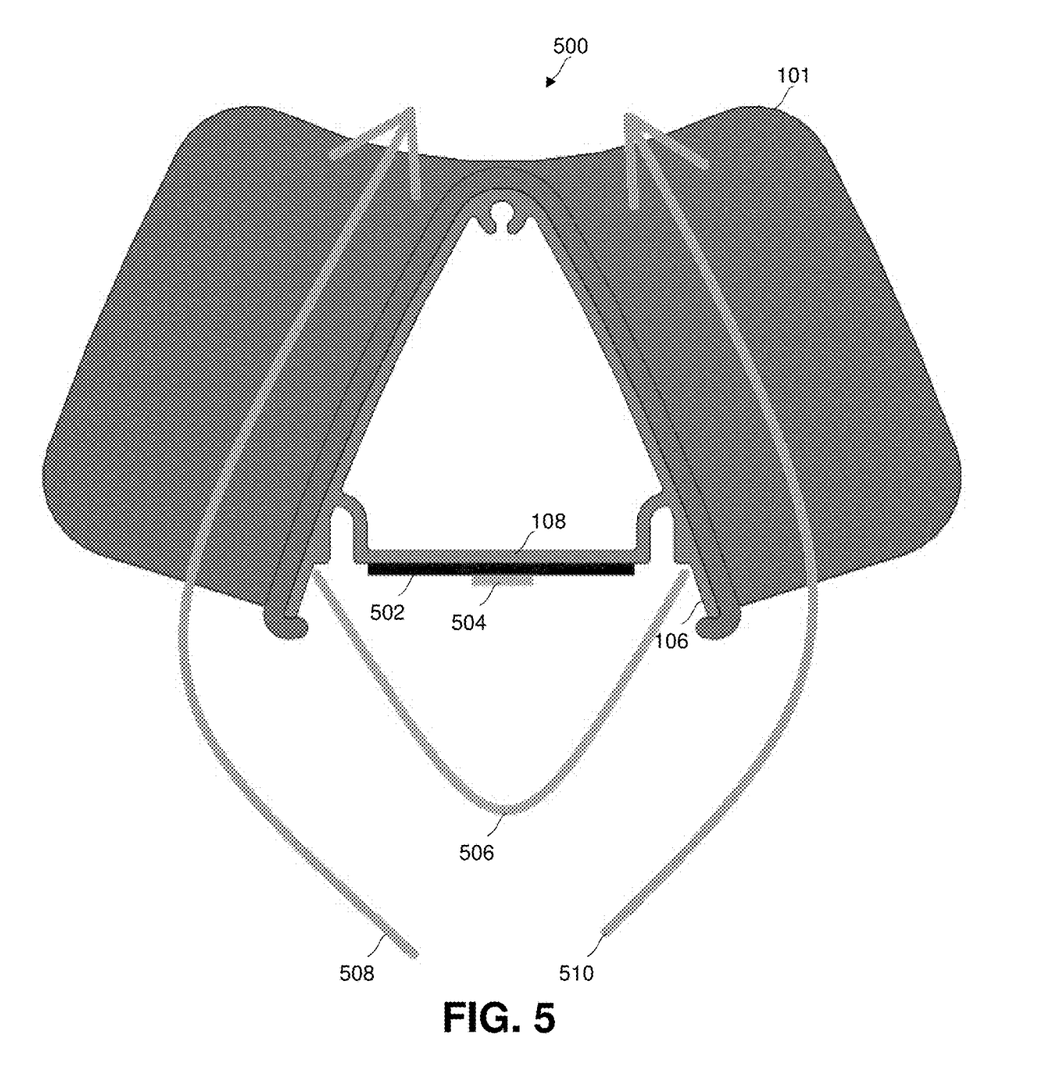
FIG. 5 illustrates a cross-sectional view of a luminaire in accordance with several aspects described herein.

FIGS. 4 and 5 illustrate cross-sectional views 400 and 500 of the luminaire assembly 100, each showing the overmolded heat dissipation structure 101 disposed on the hollow core 106. In FIG. 4, the cross-sectional view 400 shows how outer surfaces of the hollow core 106 mate with the inner surfaces of the overmolded heat dissipation structure 101. Moreover, FIG. 4 shows how the edges of the hollow core 106 rest on the lips 204 of the overmolded heat dissipation structure 101, thus providing a passive means for ensuring that the two parts are tightly fitted together after the overmolding process.

Turning now to FIG. 5, the cross-sectional view 500 shows a complete view of the luminaire assembly 100, as it is fitted with a printed circuit board 502 that has disposed thereon a light source 504, which can include a plurality of light emitting diodes (LEDs). The luminaire assembly 100 can further include a lens 506 that is disposed beneath the hollow core 106, in a direction opposite to the overmolded heat dissipation structure 101. As shown in FIG. 5, the assembly provides an air flow pattern in the directions 508 and 510, which optimizes heat dissipation in the luminaire assembly 100.

Figure 6:
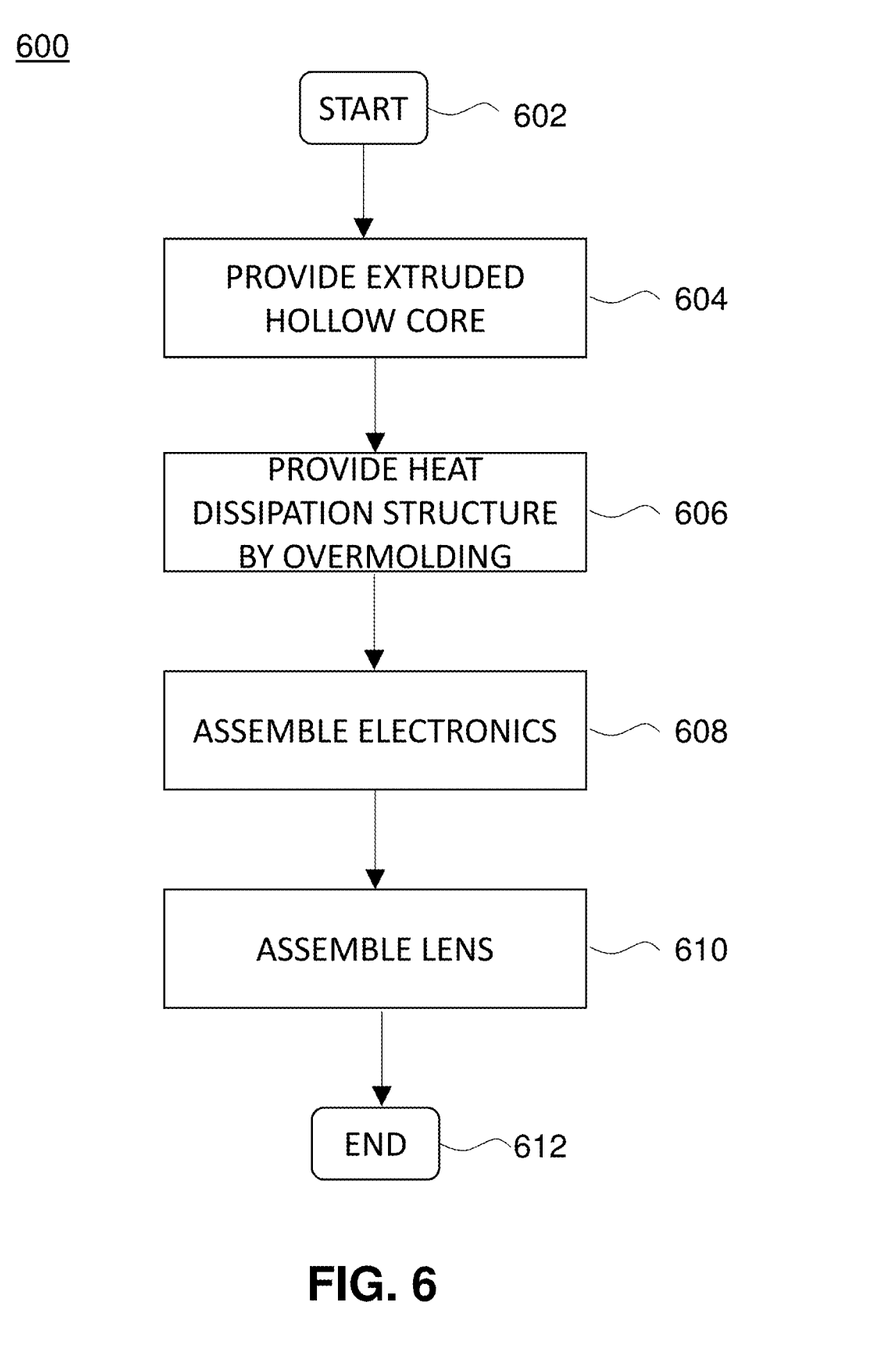
FIG. 6 depicts a flow chart of a method in accordance with several aspects described herein.

Having set forth various structural embodiments, a method 600 for assembling a luminaire consistent with these embodiments is now described with respect to FIG. 6. The method 600 begins at block 602, and it includes providing a hollow core fabricated by extrusion (block 604). At block 606, the method 600 includes over-molding a heat dissipation structure directly on top of the extruded hollow core. The method 600 then includes assembling the electronics onto a platform of the extruded hollow core (block 608), as shown in FIG. 5. The method 600 further includes, at block 610, assembling a lens onto the luminaire (see FIG. 5). The method 600 ends at block 612.

The embodiments featured herein provide a light weight design with a single piece heat dissipation structure (i.e. a heat sink) requiring no assembly. Furthermore, the embodiments provide no variation in thermal conductivity, contrary to typical luminaires where dissimilar materials are used. Moreover, relatively less metal can be used when fabricating the exemplary luminaires, which can lead to lower fixture costs as well as lower shipping and installation costs.

Furthermore, generally, some exemplary embodiments may include an assembly of an LED array on a printed circuit board (PCB), and subsequently, the PCB may be assembled on an extrusion having a cast overmold heat sink that includes a plurality of fins. Moreover, in some exemplary embodiments, an extrusion may act as a heat path to bring the heat to cast overmold fins. In other words, in some exemplary embodiments, the thermal fins need not be on a side of the extrusion's wall.

Those skilled in the relevant art(s) will appreciate that various adaptations and modifications of the embodiments described above can be configured without departing from the scope and spirit of the disclosure. For example, other embodiments can include welding a fin system to an angled extruded core like the hollow core 106. Therefore, it is to be understood that, within the scope of the appended claims, the disclosure may be practiced other than as specifically described herein.

What is claimed is:

1. A method for assembling a luminaire, the method comprising:
performing a metal extrusion process for providing an extruded hollow core having an approximately V-shape cross-section and comprising at least one sidewall having an outer surface and a platform configured to hold a printed circuit board;
overmolding a thermal dissipation structure on the outer surface of the at least one sidewall of the extruded hollow core, the overmolded thermal dissipation structure including a lip configured to support an edge of the extruded hollow core, wherein the overmolded thermal dissipation structure includes a plurality of fins which are equally spaced and arranged perpendicular to an axis of extrusion of the extruded hollow core; and
disposing a lens beneath the extruded hollow core in a direction opposite to the overmolded thermal dissipation structure, a portion of the lens being disposed above the lip of the overmolded thermal dissipation structure, the lens having a curved shape extending in a direction opposite to the overmolded thermal dissipation structure;
wherein said platform has-a light source disposed thereon.

2. The method of claim 1, wherein the overmolded thermal dissipation structure and the hollow core are made of the same material.

3. The method of claim 1, wherein the overmolded thermal dissipation structure and the hollow core are made of one of (i) aluminum and (ii) copper.

4. The method of claim 1, wherein the light source is a light emitting diode (LED).

5. The method of claim 1, wherein coefficients of thermal expansion of the overmolded thermal dissipation structure and of the hollow core are substantially the same.

6. A method for assembling a luminaire, the method comprising:

providing an overmolded thermal dissipation structure on an extruded hollow core configured to support a platform having a light source disposed thereon and wherein the extruded hollow core has a substantially V-shaped cross-section, the overmolded thermal dissipation structure including a lip configured to support an edge of the extruded hollow core, wherein the overmolded thermal dissipation structure includes a plurality of fins which are equally spaced and arranged perpendicular to an axis of extrusion of the extruded hollow core; and providing a lens disposed beneath the extruded hollow core in a direction opposite to the overmolded thermal dissipation structure, a portion of the lens being disposed above the lip of the overmolded thermal dissipation structure, the lens having a curved shape extending in a direction opposite to the overmolded thermal dissipation structure.

7. The method of claim 6, further comprising disposing the overmolded thermal dissipation structure on an outer surface of the extruded hollow core.

8. A luminaire assembly, comprising:
a hollow core, wherein the hollow core includes an extruded metal and has an approximately V-shape cross-section;
an overmolded thermal dissipation structure molded directly over the hollow core, and the hollow core and the overmolded thermal dissipation structure molded directly over the hollow core are tightly fitted together, wherein the overmolded thermal dissipation structure includes a plurality of fins which are equally spaced and arranged perpendicular to an axis of extrusion of the hollow core;
a printed circuit board assembled on the hollow core and an LED light source disposed on the printed circuit board; and
a lens disposed beneath the hollow core in a direction opposite to the overmolded thermal dissipation structure, the lens having a curved shape extending in a direction opposite to the overmolded thermal dissipation structure;
wherein the hollow core includes a cavity that passes electrical wiring interfacing with the printed circuit board, and wherein the hollow core and the overmolded thermal dissipation structure each are comprised of aluminum.

9. The luminaire assembly claim 8, further comprising the printed circuit board disposed on a platform.

10. The luminaire assembly of claim 8, wherein the hollow core and the overmolded thermal dissipation structure are made from materials that have substantially the same coefficient of thermal expansion (CTE).

11. A luminaire assembly, comprising:
a hollow core, wherein the hollow core includes an extruded metal and has a shaped cross- section, the hollow core having a body extending between two open ends;
an overmolded thermal dissipation structure molded over the hollow core, wherein the overmolded thermal dissipation structure includes a plurality of fins;
a printed circuit board assembled on the outside of the body of the hollow core at a location between the two open ends, and a light source comprising a plurality of light emitting diodes (LEDs) disposed on the printed circuit board; and
a lens disposed beneath the hollow core in a direction opposite to the overmolded thermal dissipation structure;
wherein the hollow core includes a cavity configured to pass electrical wiring interfacing with the printed circuit board; and
wherein the hollow core and the overmolded thermal dissipation structure each are comprised of aluminum.

12. The luminaire assembly claim 1, further comprising the printed circuit board disposed on a platform of the body of the hollow core.

13. The luminaire assembly of claim 11, wherein the hollow core and the overmolded thermal dissipation structure are made from materials that have substantially the same coefficient of thermal expansion (CTE).

* * * * *